US012027280B2

(12) United States Patent
Blatt et al.

(10) Patent No.: US 12,027,280 B2
(45) Date of Patent: Jul. 2, 2024

(54) OPTICAL RESONATOR DEVICE WITH CROSSED CAVITIES FOR OPTICALLY TRAPPING ATOMS, AND APPLICATIONS THEREOF IN AN OPTICAL ATOMIC CLOCK, A QUANTUM SIMULATOR OR A QUANTUM COMPUTER

(71) Applicant: Max-Planck-Gesellschaft zur Foerderung der Wissenschaften e. V., Munich (DE)

(72) Inventors: Sebastian Blatt, Garching (DE); Andre Heinz, Garching (DE); Immanuel Bloch, Munich (DE)

(73) Assignee: MAX-PLANCK-GESELLSCHAFT ZUR FOERDERUNG DER WISSENSCHAFTEN E. V., Munich (DE)

( * ) Notice: Subject to any disclaimer, the term of this patent is extended or adjusted under 35 U.S.C. 154(b) by 399 days.

(21) Appl. No.: 17/620,679

(22) PCT Filed: Jun. 19, 2019

(86) PCT No.: PCT/EP2019/066247

§ 371 (c)(1),
(2) Date: Dec. 18, 2021

(87) PCT Pub. No.: WO2020/253957

PCT Pub. Date: Dec. 24, 2020

(65) Prior Publication Data

US 2022/0301738 A1 Sep. 22, 2022

(51) Int. Cl.
*G21K 1/00* (2006.01)
*G04F 5/14* (2006.01)

(52) U.S. Cl.
CPC ............... *G21K 1/006* (2013.01); *G04F 5/14* (2013.01)

(58) Field of Classification Search
CPC .................................. G21K 1/006; G01J 3/42
See application file for complete search history.

(56) References Cited

U.S. PATENT DOCUMENTS

2007/0242707 A1 10/2007 Spiekermann et al.
2017/0016968 A1 * 1/2017 Salit ....................... G01R 33/24

(Continued)

FOREIGN PATENT DOCUMENTS

CN 102769251 A * 11/2012
CN 102769251 A1 11/2012

(Continued)

OTHER PUBLICATIONS

Poli et al., "Optical Atomic Clocks", PACSTy-Ion Trapping, Jan. 10, 2014, XPO55637378, URL:https://arxiv.org/pdf/1401.2378.pdf (Year: 2014).*

(Continued)

*Primary Examiner* — David E Smith
(74) *Attorney, Agent, or Firm* — Caesar Rivise, PC

(57) ABSTRACT

An optical resonator device (100) with crossed cavities, in particular being configured for optically trapping atoms, comprises a first linear optical resonator (10) extending between first resonator mirrors (11A, 11B) along a first resonator light path (12) and supporting a first resonator mode, a second linear optical resonator (20) extending between second resonator mirrors (21A, 21B) along a second resonator light path (22) and supporting a second resonator mode, wherein the first and second resonator light paths (12, 22) span a main resonator plane, and a carrier device carrying the first and second resonator mirrors (11A, 11B, 21A, 21B), wherein the first and second resonator mirrors (11, 21) are arranged such that the first and second resonator modes cross each other for providing an optical lattice trap (1) in the main resonator plane. The carrier device comprises a monolithic spacer body (30) being made (Continued)

of an ultra-low-expansion material and comprising first carrier surfaces (31) accommodating the first resonator mirrors (11A, 11B) and second carrier surfaces (32) accommodating the second resonator mirrors (21A, 21B), wherein the first resonator light path (12) extends through a first spacer body bore (33) in the spacer body (30) between the first carrier surfaces (31), and the second resonator light path (22) extends through a second spacer body bore (34) in the spacer body (30) between the second carrier surfaces (32). Furthermore, an atom trapping method for creating a two-dimensional arrangement of atoms and an atom trap apparatus, like an optical atomic clock, a quantum simulation and/or a quantum computing device are described.

25 Claims, 3 Drawing Sheets

(56) References Cited

U.S. PATENT DOCUMENTS

| | | | | |
|---|---|---|---|---|
| 2018/0356569 | A1 | 12/2018 | Deng et al. | |
| 2019/0199051 | A1 * | 6/2019 | Herr | H01S 3/0621 |

FOREIGN PATENT DOCUMENTS

| | | | |
|---|---|---|---|
| CN | 105334556 | A | 2/2016 |
| CN | 109478754 | A | 3/2019 |

OTHER PUBLICATIONS

Burkhart, "Optical Feedback Frequency/Stabilized Cavity Ring-Down Spectroscopy", Jan. 1, 2015, p. 1-242, XP055616765, URL:https://www.theses.fr/2015GREAY045 (Year: 2015).*

English abstract for CN 102769251 A1 (2012).

Schioppo, M. (2010). Development of a transportable strontium optical clock. Dissertation in Physics. Universita Degli Studi di Firenze, Dipoartimento di Fisica e Astronomica. pp 1-155.

Office Action issued in corresponding CN Patent Application No. 201980097652.2 mailed Sep. 23, 2023.

Bakr et al., "A quantum gas microscope for detecting single atoms in a Hubbard-regime optical lattice", Nature, vol. 462, pp. 74-78 (2009).

Blatt et al., "Low-noise optical lattices for ultracold 6Li", Physical Review, vol. A92, pp. 021402-1-021402-5 (2015).

Bloch et al., "Quantum simulations with ultracold quantum gases", Nature Physics, vol. 8, pp. 267-276 (2012).

Bloch et al., "Many-body physics with ultracold gases", Reviews of Modern Physics, vol. 80, pp. 885-964 (2008).

Boll et al., "Spin- and density-resolved microscopy of antiferromagnetic correlations in Fermi-Hubbard chains", Science, vol. 353, No. 6305, pp. 1257-1260 (2016).

Burkart, "Optical feedback frequency stabilized cavity ring-down spectroscopy", Jan. 1, 2015, pp. 1-242 [retrieved on Aug. 29, 2019]. Retrieved from the Internet <URL: https://www.theses.fr/2015GREAY045>.

Campbell et al., "A Fermi-degenerate three-dimensional optical lattice clock", Science, vol. 358, pp. 1-34 (2017).

Feynman, "Simulating Physics with Computers", International Journal of Theoretical Physics, vol. 21, Nos. 6/7, pp. 467-488 (1982).

Georgescu et al., "Quantum simulation", Reviews of Modern Physics, vol. 86, pp. 153-185 (2014).

Gross et al., "Quantum simulations with ultracold atoms in optical lattices", Science, vol. 357, pp. 995-1001 (2017).

Grotti et al., "Geodesy and metrology with a transportable optical clock", Nature Physics, vol. 14, pp. 437-441 (2018).

Hong et al., "Measurement of Subpicosecond Time Intervals between Two Photons by Interference", Physical Review Letters, vol. 59, No. 18, pp. 2044-2046 (1987).

Islam et al., "Measuring entanglement entropy in a quantum many-body system", Nature, vol. 528, pp. 77-83 (2015).

International Search Report for PCT/EP2019/066247 dated Mar. 6, 2020.

Koller et al., "Transportable Optical Lattice Clock with 7x10-17 Uncertainty", Physical Review Letters, vol. 118, pp. 073601-1-073601-6 (2017).

Leonard et al., "Optical transport and manipulation of an ultracold atomic cloud using focus-tunable lenses", New Journal of Physics, vol. 16, pp. 1-8 (2014).

Leonard et al., "Supersolid formation in a quantum gas breaking continuous translational symmetry", Nature, vol. 543, pp. 1-9 (2017).

Lewis-Swan et al., "Robust Spin Squeezing via Photon-Mediated Interactions on an Optical Clock Transition", Physical Review Letters, vol. 121, pp. 070403-1-070403-5 (2018).

Ludlow et al., "Optical atomic clocks", Reviews of Modern Physics, vol. 87, pp. 637-701 (2015).

Mazurenko et al., "Implementation of a stable, high-power optical lattice for quantum gas microscopy", Rev. Sci. Instrum., vol. 90, pp. 033101-1-033101-13 (2019).

Mazurenko et al., "A cold-atom Fermi-Hubbard antiferrogmagnet", Nature, vol. 545, pp. 462-473 (2017).

Oelker et al., "Optical clock intercomparison with 6x10-19 precision in one hour", arXiv:1902.02741, pp. 1-34 (2019).

Origlia et al., "Towards an optical clock for space: Compact, high-performance optical lattice clock based on bosonic atoms", Physical Review, vol. A98, pp. 053443-1-053443-11(2018).

Poli et al., "Strontium Optical Lattice Clock with All Semiconductor Sources", Frequency Control Symposium, 2007 Joint with the 21st European Frequency and Time Forum. IEEE International, PI,01 pp. 655-658 (2007).

Poli et al., "Optical atomic clocks", retrieved from the internet: https://arxiv.org/pdf/1401.2378.pdf, XP055667378 (2014).

Sherson et al., "Single-atom-resolved fluorescence imaging of an atomic Mott insulator", Nature, vol. 467, pp. 68-73 (2010).

Written Opinion for PCT/EP2019/066247 dated Mar. 6, 2020.

* cited by examiner

OPTICAL RESONATOR DEVICE WITH CROSSED CAVITIES FOR OPTICALLY TRAPPING ATOMS, AND APPLICATIONS THEREOF IN AN OPTICAL ATOMIC CLOCK, A QUANTUM SIMULATOR OR A QUANTUM COMPUTER

CROSS-REFERENCE TO RELATED APPLICATIONS

This application is a U.S. National Phase Application of PCT/EP2019/066247, filed Jun. 19, 2019, the contents of which application are incorporated herein by reference in their entireties for all purposes.

FIELD OF THE INVENTION

The invention relates to an optical resonator device with crossed cavities (cross cavity resonator), in particular being configured for optically trapping atoms, e. g. for applications in an optical atomic clock including an optical lattice trap or in a quantum simulator, in particular a quantum gas microscope. Furthermore, the invention relates to methods of using the optical resonator device, e. g. for providing reference atoms of an optical atomic clock or sample atoms in a quantum simulator or a quantum computer. Furthermore, the invention relates to an optical atomic clock and to a quantum simulator including the optical resonator device.

PRIOR ART

In the present specification, reference is made to the following prior art illustrating the technical background of the invention:

[1] A. D. Ludlow, M. M. Boyd, J. Ye, E. Peik, and P. O. Schmidt. Optical atomic clocks, Review of Modern Physics 87, 637 (2015);

[2] J. Grotti et al. Geodesy and metrology with a transportable optical clock, Nature Physics 14, 437 (2018);

[3] S. B. Koller, J. Grotti, S. Vogt, A. Al-Masoudi, S. Dorscher, S. Hafner, U. Sterr, and C. Lisdat. Transportable Optical Lattice Clock with $7\times10^{-17}$ Uncertainty, Physical Review Letters 118, 073601 (2017);

[4] S. Origlia et al. Towards an optical clock for space: Compact, high-performance optical lattice clock based on bosonic atoms, Physical Review A 98, 053443 (2018);

[5] S. Campbell et al. A Fermi-degenerate three-dimensional optical lattice clock, Science 358, 90 (2017);

[6] E. Oelker et al. Optical clock intercomparison with $6\times10^{-19}$ precision in one hour, arXiv:1902.02741 (2019);

[7] R. P. Feynman. Simulating physics with computers, International Journal of Theoretical Physics 21, 467 (1982);

[8] I. Bloch, J. Dalibard, and W. Zwerger. Many-body physics with ultracold gases, Review of Modern Physics 80, 885 (2008);

[9] I. Bloch and C. Gross. Quantum simulations with ultracold atoms in optical lattices, Science 357, 995 (2017);

[10] I. Bloch, J. Dalibard, and S. Nascimbene. Quantum simulations with ultracold quantum gases, Nature Physics 8, 267 (2012);

[11] I. M. Georgescu, S. Ashhab, and F. Nori. Quantum simulation, Reviews of Modern Physics 86, 153 (2014);

[12] W. S. Bakr, J. I. Gillen, A. Peng, S. Foiling, and M. Greiner. A quantum gas microscope for detecting single atoms in a Hubbard-regime optical lattice, Nature 462, 74 (2009);

[13] J. F. Sherson, C. Weitenberg, M. Endres, M. Cheneau, I. Bloch, and S. Kuhr. Single-atom-resolved fluorescence imaging of an atomic Mott insulator, Nature 467, 68 (2010);

[14] A. Mazurenko, C. S. Chiu, G. Ji, M. F. Parsons, M. Kanász-Nagy, R. Schmidt, F. Grusdt, E. Demler, D. Greif, and M. Greiner. A cold-atom Fermi-Hubbard antiferromagnet, Nature 545, 462 (2017);

[15] M. Boll, T. A. Hilker, G. Salomon, A. Omran, J. Nespolo, L. Pollet, I. Bloch, and C. Gross. Spin and Charge Resolved Quantum Gas Microscopy of Antiferromagnetic Order in Hubbard Chains, Science 353, 1257 (2016);

[16] C. K. Hong, Z. Y. Ou, and L. Mandel. Measurement of subpicosecond time intervals between two photons by interference, Physical Review Letters 59, 2044 (1987);

[17] R. Islam, R. Ma, P. M. Preiss, A. Lukin, M. Rispoli, and M. Greiner. Measuring entanglement entropy in a quantum many-body system, Nature 528, 77 (2015);

[18] Julian Leonard, Andrea Morales, Philip Zupancic, Tilman Esslinger, and Tobias Donner "Supersolid formation in a quantum gas breaking continuous translational symmetry", Nature 543, 87 (2017)

[19] S. Blatt, A. Mazurenko, M. F. Parsons, C. S. Chiu, F. Huber, and M. Greiner. Low-noise optical lattices for ultracold $^6$Li, Physical Review A 92, 021402 (2015);

[20] A. Mazurenko, S. Blatt, F. Huber, M. F. Parsons, C. S. Chiu, G. Ji, D. Greif, and M. Greiner. Implementation of a stable, high-power optical lattice for quantum gas microscopy, Review of Scientific Instruments 90, 033101 (2019);

[21] J. Leonard, M. Lee, A. Morales, T. M. Karg, T. Esslinger, and T. Donner. Optical transport and manipulation of an ultracold atomic cloud using focus-tunable lenses, New Journal of Physics 16, 093028 (2014); and

[22] R. J. Lewis-Swan, M. A. Norcia, J. R. K. Cline, J. K. Thompson, and A. M. Rey. Robust Spin Squeezing via Photon-Mediated Interactions on an Optical Clock Transition, Physical Review Letters 121, 070403 (2018).

It is generally known that units of measurement in the international system of units and measurements, encoded in the Systéme International (SI), recently have been defined by combinations of fundamental physical constants. The next update to the SI system will be a change in the definition of the second. The SI second is defined as a certain number of oscillations of a microwave transition between two hyperfine states of the cesium atom, measured in a so-called cesium fountain clock. Within the last fifteen years, a new type of frequency standard based on optical transitions of strontium atoms trapped in optical lattices, so called optical lattice clocks, have surpassed the stability and accuracy of the cesium fountain standard by two orders of magnitude [1]. For this reason, the SI second is scheduled for redefinition in terms of an optical standard within the next few years.

Optical lattice clocks have become so precise that the effects of general relativity can be directly observed by simply raising the clock by a few centimeters in Earth's gravitational field [1]. This capability opens up completely new possibilities for direct measurements of the gravitational potential with applications in geodesy [2]. More precise measurements of time will also dramatically improve the precision of global satellite-based navigation. Optical frequency standards are already being linked up into quantum networks via ground-based optical fiber networks. These networks will provide phase-coherent links between remote laboratories across Europe and internationally [1]. In the future, such links will enable detecting gravitational waves on Earth-sized scales and will allow very-long baseline interferometry for other astronomical or deep-space observations.

All of these near-future applications of optical atomic clocks will have to rely on efficient and robust optical standards that are compatible with hands-off operation, e. g. on a space craft, a satellite, an airplane, or a moving vehicle. Space-based systems in particular will need to be resilient against strong accelerations during the launch phase, and cannot be realigned manually after launch. Accordingly, there is an interest in removing optical atomic clocks being configured as optical lattice clocks from the highly controlled environment in an earth-based quantum metrology lab and providing robust and/or transportable optical atomic clocks for routine applications.

A transportable optical lattice clock has been realized in Ref. [2, 3]. This clock uses strontium atoms in a one-dimensional optical lattice that is formed by reflecting an initial laser beam once and superimposing the reflected laser beam with the initial laser beam. The clock uses a fixed retroreflector, but otherwise standard kinematic mounts that are subject to temperature drifts, vibrations and which require readjustment after being subjected to strong accelerations. Although the clock of Ref. [2, 3] is contained in a truck, it is not possible to run it while it is being moved. The ISOC project specifically aims to construct a space-compatible optical lattice clock [4]. The collaboration aims to reduce weight and power consumption, and to improve long-term stability. Nevertheless, the standard one-dimensional lattice using the retroreflected laser beam is currently used.

The latest generation of optical lattice clocks [5, 6] uses two-dimensional optical lattices and a Fermi degenerate gas of strontium atoms in the focus of a high-resolution microscope objective. The setup is almost identical to the quantum gas microscopes used for quantum simulation (see below). However, this laboratory-based standard is still using optical lattices using retroreflected beams and is constrained by optical power requirements to lattice beam waists (the $1/e^2$ beam radius) of about 100 μm, thus limiting the number of reference atoms and the signal-to-noise ratio of the optical lattice clock.

Another main application of optical lattices is the related field of quantum simulation [7] with ultracold atoms in optical lattices [8, 9]. Just as in an optical frequency standard, atoms are trapped and manipulated by laser light in such a quantum simulator. To hold onto the atoms, they are confined to the intensity maxima of retroreflected laser beams that form an optical lattice trap. Instead of simply probing the clock transition of the trapped atoms, quantum simulators are used for investigating quantum many-body dynamics that arise when atoms tunnel and interact in the optical lattice [8]. At temperatures below a millionth of a Kelvin above absolute zero, the motion of the atoms and their interaction must be described quantum-mechanically.

Quantum simulators based on ultracold atoms are used to gain much deeper insight into the dynamics of quantum-mechanical models, like the Hubbard model [9] describing the motion of electrons in crystals in condensed-matter physics. Progress in this field, e. g. in investigating the physics of quantum spin systems and many more exotic phenomena beyond the reach of solid-state devices or computational methods are described in [9, 10, 11]. A large part of the progress within the last decade has been enabled by novel microscopy techniques that allow observing and controlling each individual atom in the plane of a high-resolution imaging system [12, 13]. However, even with these new techniques, it remains very challenging to create low-temperature quantum systems of more than a few ten atoms, while maintaining full control over each individual one.

One of the main challenges for quantum simulation with ultracold atoms in optical lattices is to make the trapping conditions more homogeneous. As mentioned above, optical lattices typically are formed by retroreflected laser beams. Any such beam must have a finite extent transverse to its propagation direction. The transverse intensity profile of a laser beam results in a transverse variation of the depth of the optical lattice that forms. This depth variation then leads to a variation of the tunneling rates and interaction parameters. Because the system parameters change as a function of position, one cannot realize completely homogeneous quantum systems in optical lattices. The inhomogeneity translates into a finite extent of desirable quantum phases, such as the Mott insulator, wherein the atoms arrange themselves such that a single atom occupies each lattice site. The Mott insulating phase is the lowest-entropy quantum phase that can currently be realized and often serves as the initialization of a quantum simulator. The fidelity of such simulations is limited by the finite size and the imperfections of the initial Mott insulator. For this reason, it is desirable to decrease optical lattice inhomogeneity and to increase achievable Mott insulator sizes.

The most homogeneous optical lattice systems have been demonstrated in quantum gas microscope setups [9]. Here, the high spatial resolution allows modifying the optical lattice locally and some of the inhomogeneity due to the transverse shape of the lattice laser beams can be compensated for. This compensation is particularly important for fermionic atoms [14], which (due to the Pauli exclusion principle) spread out over larger regions of the optical lattice than bosonic atoms. State-of-the-art quantum gas microscopes with fermionic atoms can produce almost defect-free checkerboard patterns of atoms with about 30*30 atoms (this is the Mott insulating phase of the Hubbard model) [14, 15]. These sizes are limited by the transverse extent of the laser beams that generate the optical lattice potential, which is limited by the laser power available from high-power solid state lasers at 1064 nm (about 50 W). State-of-the-art quantum simulations using such Mott insulators as a starting point are already limited by how identical the sites of the lattice can be made. The standard quantum optics method to quantify how identical particles are is the Hong-Ou-Mandel effect [16]. In this effect, two identical photons are brought onto a beam splitter. If the photons are perfectly identical, they will always exit one of the ports of the beam splitter together. One then never finds one photon in one port and the other photon in the other port. This effect can be translated to massive particles, and has already been measured in a quantum gas microscope with bosons [17]. This measurement was limited to interfering two samples of four atoms each, because it was impossible to find more lattice sites that were identical enough. Accordingly, there is an interest in creating larger optical lattice traps with improved homogeneity also for quantum simulation applications.

The simplest approach to achieve the above goals could be based on simply increasing the transverse extent of the lattice laser beams. However, both quantum metrology and quantum simulation require lattices that are extremely amplitude- and frequency-stable. Increasing the beam size is challenging because state-of-the-art quantum simulation labs already use the largest possible beam sizes achievable by the highest-power lasers with the required stability criteria.

The above problems are even more challenging if, as an alternative to retroreflected laser beams, resonant light field enhancement is used for creating the optical trap. In this case, the optical trap is arranged in an optical resonator, in particular in a waist of a resonator mode of the optical resonator. For creating a two-dimensional optical trap, an optical resonator with crossed cavities is used as described e. g. in Ref. [18]. The conventional optical resonator with crossed cavities comprises two pairs of resonator mirrors standing on a common substrate. For obtaining a sufficient trapping stability, this setup is restricted to small mode waist diameters of about 200 μm in the trap, thus limiting the number of atoms and the signal-to-noise-ratio of the quantum simulation application. Furthermore, as the optical resonator is operated in vacuum, the resonator geometry can drift as a result of creating the vacuum or heating processes after creating the vacuum.

Objective of the Invention

The objective of the invention is to provide an improved optical resonator device for optically trapping atoms avoiding disadvantages of conventional techniques. In particular, the objective of the invention is to provide an improved optical resonator device having a robust configuration, allowing a mobile operation, keeping stability even at strong acceleration, providing homogeneous trapping conditions, allowing the creation of a lattice trap in more than one dimension and/or allowing the creation of a lattice trap with increased size and number of trapped particles. Furthermore, the objective of the invention is to provide an improved method of optically trapping atoms using the optical resonator device. Furthermore, the objective of the invention is to provide an improved atom trap apparatus for creating a two-dimensional arrangement of atoms and applications thereof in an optical atomic clock, a quantum simulator or a quantum computer.

BRIEF SUMMARY OF THE INVENTION

These objectives are correspondingly solved by an optical resonator device of the invention and by the inventive method of optically trapping atoms employing the optical resonator device, and an atom trap apparatus, like an optical atomic clock, a quantum simulator and/or a quantum computer employing the optical resonator.

According to a first general aspect of the invention, the above objective is solved by an optical resonator device with crossed cavities, comprising a first linear optical resonator (first cavity) extending between first resonator mirrors along a first straight resonator light path and supporting at least one first resonator mode, and a second linear optical resonator (second cavity) extending between second resonator mirrors along a second straight resonator light path and supporting at least one second resonator mode. Each of the first and second optical resonators comprises a pair of resonator mirrors. Each resonator mirror comprises a mirror substrate and a reflective coating facing towards the other resonator mirror of the related optical resonators. The reflective coatings preferably comprise stacks of dielectric layers being selected such that a certain reflectivity is obtained for a wavelength of operation. The first and second optical resonators cross each other, i. e. the first and second resonator light paths intersect each other. The first and second resonator modes cross each other. The plane accommodating the first and second resonator light paths is indicated here as the main resonator plane.

Furthermore, the optical resonator device includes a carrier device supporting the first and second resonator mirrors. The first and second resonator mirrors are fixedly positioned on the carrier device. Due to the crossing configuration of the first and second cavities, an optical lattice trap can be provided in the main resonator plane, where the first and second resonator modes (lattice laser beams) cross each other. The carrier device and the first and second resonator mirrors connected with the carrier device are adjusted such that in a condition where light fields are coupled into the first and second optical resonators, the light fields are superimposed and field extrema providing the optical lattice trap are created. The optical lattice trap is a section of the crossing cavity where atom trapping light field extrema can be created by laser light travelling within the resonators. Preferably, both of the first and second optical resonators have equal geometry in terms of resonator lengths and mirror shapes, so that identical or at least sufficiently similar resonator modes can be supported by the first and second optical resonators.

According to the invention, the carrier device comprises a monolithic spacer body, which is made of a solid, ultra-low-expansion material and which comprises first carrier surfaces (i. e. a first pair of carrier surfaces) accommodating the first resonator mirrors and second carrier surfaces (i. e. a second pair of carrier surfaces) accommodating the second resonator mirrors. The spacer body is a monolithic body, i. e. it is made of one single integral material block. The monolithic spacer body comprises ultra-low-expansion material, i. e. a material having no thermal expansion or a minimal thermal expansion coefficient. Preferably, the material of the monolithic spacer body has a function of thermal expansion with zero crossing at the temperature of operating the optical resonator device, preferably at room temperature or at cryogenic temperatures. The carrier surfaces comprise surface sections of the spacer body. Preferably, the carrier surfaces are plane surface sections extending perpendicular to the main resonator plane. The carrier surfaces are outer lateral side surfaces of the spacer body. The mirror substrates of the resonator mirrors preferably are made of transparent materials, thus allowing incoupling of light into the resonators, and materials simultaneously having a thermal expansion coefficient being equal to or matched to the thermal expansion coefficient of the spacer body material.

Furthermore, according to the invention, the first resonator light path extends through a first spacer body bore in the spacer body between the first carrier surfaces, and the second resonator light path extends through a second spacer body bore in the spacer body between the second carrier surfaces. The first spacer body bore and the second spacer body bore are hollow channels through the spacer body, which are bisected by their intersection. Each of the first and second spacer body bores has an inner diameter being larger than the mode diameter of at least one first resonator mode and at least one second resonator mode, respectively. Spacer body bores generally also can be understood as holes or channels through the spacer body, and they are radially completely enclosed by the spacer body material.

Preferably, the spacer body has a plate shape extending along the main resonator plane. The dimension of the spacer body perpendicular to the main resonator plane is indicated as thickness of the spacer body. The spacer body thickness is selected such that the spacer body has sufficient mechanical stability and the carrier surfaces have a sufficient size for attaching the resonator mirrors.

According to a second general aspect of the invention, the above objective is solved by an atom trapping method for creating a two-dimensional arrangement of atoms, wherein the optical resonator device according to the above first general aspect of the invention is used. The atom trapping method comprises the steps of creating the optical lattice trap in a region where the first and second resonator modes cross each other. The optical lattice trap is created by coupling laser beams into the first and second resonators. Due to the resonant geometry of each of the resonators, resonator modes are supported, which are superimposed at the intersection of the resonators, so that the optical lattice trap is formed. A cloud of atoms in the optical resonator device is trapped in the optical lattice trap. The atoms can be introduced into the optical resonator device before or after creating the optical lattice trap. When the atoms are positioned at field extrema of the optical lattice trap, metrology and/or simulation applications of the trapped atoms can be implemented as outlined below.

Preferably, the step of creating the optical lattice trap comprises coupling first and second continuous wave (cw) laser beams into the first and second optical resonators, respectively, such that the optical lattice trap is formed by overlapping of the first and second resonator modes at the intersection of first and second spacer body bores. With preferred application of the invention, imaging the atoms trapped in the optical lattice trap with an imaging device, exciting and detecting transitions between energy states of the trapped atoms and/or exploiting interactions between the atoms for purposes of quantum simulation and/or quantum computing can be provided.

Advantageously, the inventive optical resonator device allows the provision of two well-overlapped optical light field modes with large mode diameter. The optical resonator device is suitable for in-vacuum operation, and it has an extremely high stability which does not exist so far in the field of optical lattice traps. Employing the spacer body facilitates the adjustment of the optical resonators (one single adjustment, initial adjustment per resonator) and provides stability and durability after the initial adjustment. Contrary to conventional techniques, e. g. Ref. [18], the resonator mirrors are not mounted in mirror mounts, but they are directly fixed in a two-dimensional, plane manner to the spacer body. The invention uses the spacer body as one single mirror holder without movable parts carrying all mirrors of the first and second optical resonators. Any instabilities introduced by multiple mirrors holders are avoided.

In particular, the invention addresses the challenges that face both quantum metrology and quantum simulation with ultracold atoms in optical lattices. These challenges are solved by reflecting the lattice laser beams between high-reflectivity mirrors many times. This optical resonator thus enhances the intensity of the optical lattice and allows to use large beams. Both optical frequency standards and quantum simulators benefit strongly from using optical lattices in more than one dimension. For this reason, the invention provides two such optical cavities with different, preferably orthogonal axes, such that the resulting standing waves overlap perfectly.

Creating two large, well-overlapped resonator beams, e. g. at visible and/or near-infrared wavelengths puts extreme requirements on the mechanical precision of the support structure for the resonator mirrors. The invention overcomes this technical challenge as it has been demonstrated by the inventors. The invention uses a fully passive design of the resonator components, i. e. the resonators are free of mutually movable materials. All components of the resonator device preferably are thermally stable solids, in particular glasses, that are optically bonded without any adhesives. Ultra-low-expansion glass ensures that the alignment of the optical lattices is stable against thermal influences. This construction also makes the invention resilient against large accelerations and makes it compatible with extreme-high vacuum (XHV) requirements. By changing parameters of the reflective coating on the mirror substrates of the resonator mirrors, in particular the materials and thicknesses of dielectric layers thereof, the invention can be adapted to any optical wavelength compatible with high-quality thin-film technology. These features solve many of the technical issues in conventional quantum simulation. However, they also make the invention uniquely suited for inclusion in any transportable optical lattice clock, particularly for space missions.

According to a preferred embodiment of the invention, the first resonator mirrors are bonded to the first carrier surfaces and the second resonator mirrors are bonded to the second carrier surfaces in an adhesive-free manner. Advantageously, any mechanical or thermal instabilities of the optical resonator device are minimized by omitting adhesives. Particularly preferred, the first and second resonator mirrors are optically bonded to the first and second carrier surfaces, respectively. Optical bonding has advantages in terms of the simple process of implementation.

According to a further preferred embodiment of the invention, at least one mirror of the first pair of resonator mirrors comprises a curved mirror (first curved mirror) and at least one mirror of the second pair of resonator mirrors comprises a curved mirror (second curved mirror). Preferably, the curved mirrors are spherical mirrors. Providing the curved mirrors provides a design supporting all Hermite-Gauss modes $TEM_{ij}$ (resonator modes which are described with Hermite-Gaussian functions) of the resonators. For creating the optical lattice trap, the lowest order Hermite-Gauss mode $TEM_{00}$ is used, i. e. the first and second resonator mirrors support Gaussian resonator laser beams. Preferably, the first and second optical resonators are designed such that the first and second resonator modes intersect each other in a central section where both modes have equal or sufficiently diameters.

According to a particularly preferred embodiment of the invention, the first and second curved mirrors have a radius of curvature being selected such that the optical lattice trap has a dimension of $2*w_0$ in the main resonator plane of at least 300 μm, in particular at least 400 μm, wherein $w_0$ is the $1/e^2$ waist radius of the first and second resonator modes.

Advantageously, the invention can provide waists of e. g. about 400 μm at the required wavelength. Implementing the invention provides a factor of 16 improvement in the system size. Using 16 times more atoms directly improves the signal-to-noise of a e.g. a frequency standard using this invention by a factor of 4 using classical averaging alone. Taking advantage of quantum metrological techniques[22] could enhance the signal-to-noise by the full factor of 16. The invention directly can be used to improve the homogeneity and thus the number of identical sites by the same factor of 16 mentioned above. This factor then directly improves the fidelity of any state-of-the-art quantum simulation with bosonic or fermionic atoms because it makes the particles that much more identical.

If each resonator is a combination of one of the curved mirrors and plane mirrors, i. e. if the first resonator mirrors comprise the first curved mirror and a first plane mirror and the second resonator mirrors comprise the second curved mirror and a second plane mirror, advantages in terms of superimposing the resonator modes and creating the optical lattice trap are obtained.

Preferably, the ultra-low-expansion material has thermal expansion like ultra low expansion glass (tradename). Particularly preferred, the monolithic spacer body is made of one piece of ultra-low-expansion glass. Alternatively, the monolithic spacer body can be made of other glass materials having no or negligible thermal expansion like the ultra-low-expansion glass. As a further alternative, the spacer body can be made of crystalline silicon. As the latter embodiment requires silicon mirror substrates, so that there is no differential thermal expansion between mirror and spacer and silicon is not transparent to visible light, but to telecom wavelengths (e.g. 1550 nm) this embodiment is adapted for infrared wavelength range applications. In addition, the crystalline silicon space embodiment is operated at 100 K, where zero crossing of the thermal expansion of silicon is obtained.

If, according to a further preferred embodiment of the invention, the first and second spacer body bores are orthogonal relative to each other in the main resonator plane, advantages in terms of a homogeneous distribution of local field extrema of the optical lattice trap are obtained. Otherwise, if the first and second spacer body bores are not orthogonal relative to each other, another deformed distribution of local field extrema of the optical lattice trap can be created if required for a particular application of the optical resonator device.

Particularly preferred, the first and second spacer body bores are arranged in the spacer body with mirror symmetry relative to a normal plane oriented perpendicular to the main resonator plane. Advantageously, the stability of the spacer body is increased with the symmetry of the spacer body bores. Furthermore, possible mechanical vibrations of the body have symmetry relative to the normal plane as well, so that an influence of the mechanical vibrations on the creation of the optical lattice trap is minimized.

According to a further advantageous embodiment of the invention, the monolithic spacer body has a third spacer body bore extending perpendicular to the main resonator plane and crossing the first and second spacer body bores at their intersection. Advantageously, the third spacer body bore fulfills a double function. Firstly, the evacuation of the inner space of the spacer body is facilitated. The evacuation can be expedited and/or an inhomogeneous evacuation can be avoided. Secondly, the third spacer body bore offers an additional optical access to the optical lattice trap. Thus, according to a particularly preferred embodiment of the invention, the optical resonator device further comprises an imaging device, like e. g. an optical microscope being arranged for imaging the optical lattice trap along the third spacer body bore. The third spacer body bore preferably has a diameter larger than the diameter of the first and second spacer body bores, in particular a diameter allowing the position of the front lens of the imaging device optics just adjacent to the optical lattice trap. Advantageously, this allows an optical monitoring and/or spectroscopic investigating of the optical lattice trap with a large numerical aperture and high resolution.

Additionally or alternatively, the third spacer body bore can be arranged for accommodating a third light path with a direction deviating from the main resonator plane and a retroreflector mirror can be arranged for creating a trapping light field along the third light path. In this case, the third spacer body bore preferably intersects the whole spacer body, so that the laser light for confining the optical lattice trap perpendicular to the main resonator plane can be introduced from a side opposite to the imaging device. The retroreflector mirror can be provided by a section of the front lens of the imaging device optics.

If the monolithic spacer body has at least one further spacer body bore extending parallel to the main resonator plane and crossing the first and second spacer body bores at their intersection, further advantages in terms of coupling additional measuring light beams into the optical lattice trap, e. g. for interrogating trapped atoms or their interactions, are obtained. With a particularly preferred example, the monolithic spacer body has two further spacer body bores being symmetrically arranged relative to the arrangement of the first and second spacer body bores. Again, advantages for the mechanical behavior of the spacer body are obtained with the symmetry of the two further spacer body bores.

Another particular advantage of the invention results from the fact that there are no particular restrictions with regard to the outer shape of the spacer body of the optical resonator device. The outer shape of the spacer body can be selected in dependency on particular application conditions of the optical resonator device, e. g. a cuboid spacer shape, a polygonal spacer shape or a cylindrical spacer shape, i. e. a footprint area of the spacer body plate parallel to the main resonator plane can have e. g. a circular, elliptic, rectangular or polygonal or another shape.

According to a particularly preferred embodiment of the invention, the monolithic spacer body has a shape of an octagon extending parallel to the main resonator plane, wherein the first and second carrier surfaces are lateral side surfaces of the octagon. The octagon has particular advantages in terms providing multiple spacer body bores, bore symmetry and symmetry of possible body vibrations.

According to a further preferred variant of the invention, the first and second resonator mirrors have dielectric coatings providing a reflectivity of at least 99%. This limit allows an efficient coupling of laser beams into the crossed cavities and simultaneously a resonant enhancement of the laser beams, e. g. with a finesse of at least 300 and an enhancement of at least 100. Particularly preferred, the dielectric coatings are designed for providing the reflectivity of at least 99% for multiple resonant wavelengths of the first and second optical resonators.

Preferably, geometric measures of the optical resonator device are selected with at least one of the following intervals. The spacer body preferably has a dimension, e. g. diameter (length) along the main resonator plane in a range from 3 cm to 20 cm. Additionally or alternatively, the first and second resonator mirrors can have a diameter in a range from 10 mm to 30 mm. This diameter range is preferred in terms of large mode diameters at the intersection of the first and second optical resonators and the capability of polishing curved resonator mirror(s). Additionally or alternatively, each of the first and second pairs of resonator mirrors comprise one curved mirror having a radius of curvature in a range from 1 m to 20 m. Additionally or alternatively, each of the first and second pairs of resonator mirrors can be arranged with an alignment such that the reflected laser beams within the first and second optical resonators are displaced from the center of the bore by less than 25% of the bore diameter. Additionally or alternatively, the laser beams within the crossed resonators do not deviate from central resonator axes by more than 1 mm.

According to a third general aspect of the invention, the above objective is solved by an atom trap apparatus, being adapted for creating a two-dimensional arrangement of atoms and comprising the optical resonator device according to the above first general aspect of the invention. The atom trap apparatus further includes a laser device being adapted for coupling continuous wave laser beams into the first and second optical resonators, an atom source and supply device being connected with the optical resonator device being adapted for creating an atom cloud and introducing the atoms, e. g. with optical and/or magnetic traps into the optical resonator device, and an imaging device being adapted for imaging the optical trap lattice in the optical resonator device.

According to a first main application of the invention, the atom trap apparatus is an optical atomic clock. With this embodiment, the imaging device is arranged for probing optical transitions in the trapped atoms, like e. g. Sr atoms. According to a further main applications of the invention, the atom trap apparatus is configured as a quantum simulation or quantum computing device.

BRIEF DESCRIPTION OF THE DRAWINGS

Further details and advantages of the invention are described in the following with reference to the attached drawings, which schematically show in.

PREFERRED EMBODIMENTS OF THE INVENTION

Features of preferred embodiments of the invention are described in the following with reference to the configuration of the optical resonator device and the structure of the atom trap apparatus. Details of applications of the invention, like details of operating an optical atomic clock or a quantum simulator are not described as they are implemented as known per se from prior art techniques. The implementation of the invention is not restricted to the illustrated embodiments, e. g. regarding the octagon shape and/or dimensions of the spacer body and features of the mirrors, but correspondingly possible with modified features of the invention.

Crossed Cavity Design of the Optical Resonator Device

Figure 1:
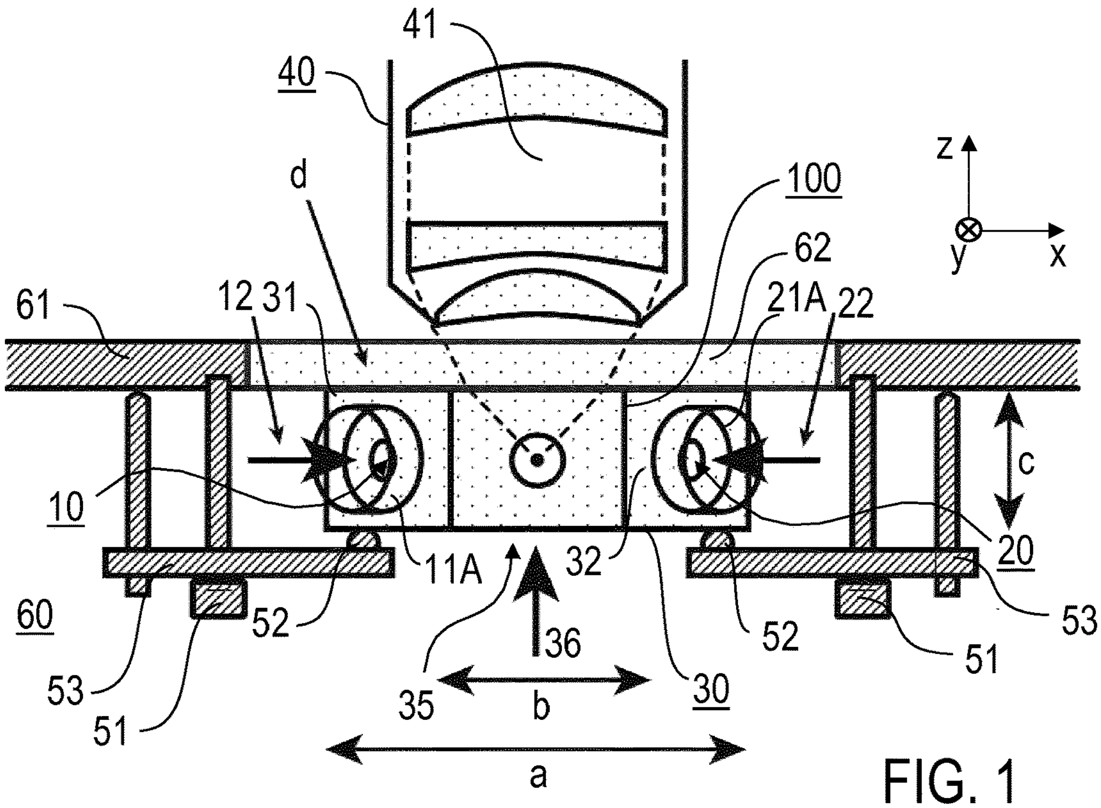
FIG. 1: a first embodiment of the optical resonator device according to the invention.
Figure 2:
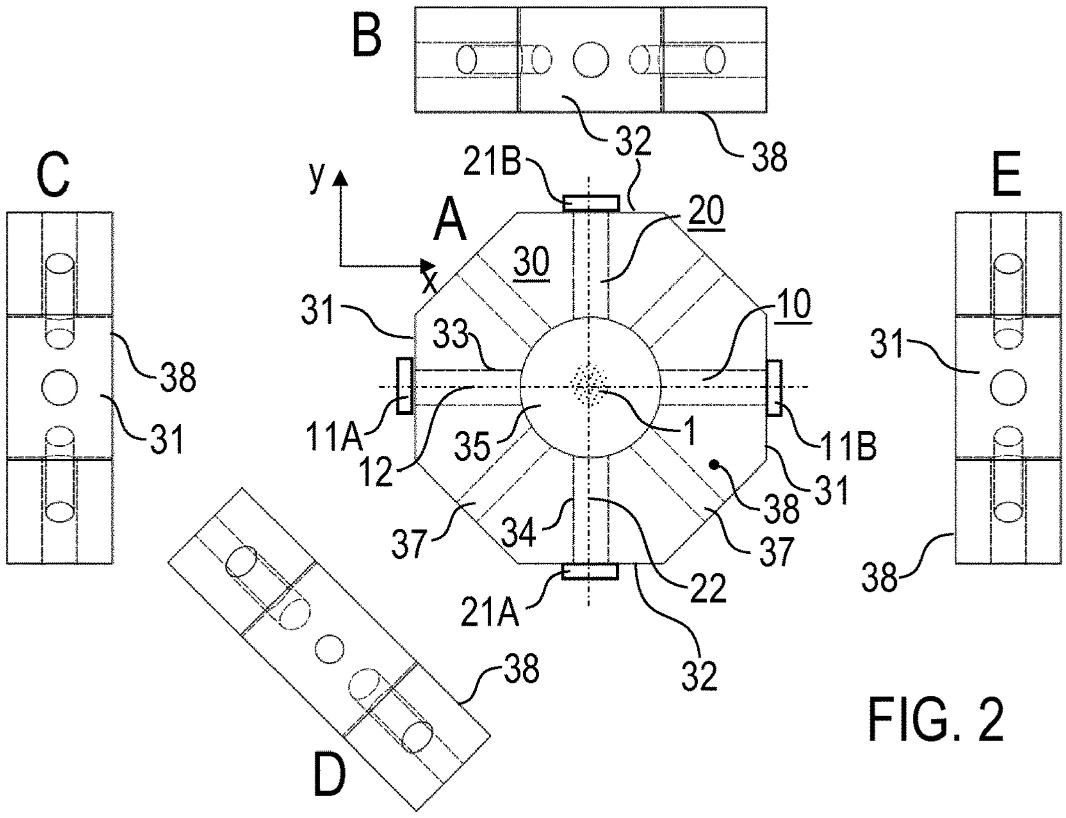
FIG. 2: further features of an embodiment of the optical resonator device according to the invention.

FIGS. 1 and 2 show a side view (FIG. 1) and multiple phantom views (FIGS. 2A to 2E) of embodiments of the inventive optical resonator device 100 with the first and second, crossed optical resonators 10, 20 and the spacer body 30 thereof. FIG. 2A shows a top view on the spacer body 30 with attached resonator mirrors, while FIGS. 2B to 2D show illustrative side views of the spacer body 30 (without the mirrors).

The crossed cavities, or "crossed cavity", of the first and second optical resonators 10, 20 are provided by the ultralow-expansion glass octagon-shaped spacer body 30, two curved mirrors 11A, 21A, and two flat mirrors 11B, 21B. The resonator mirrors 11A, 11B, 21A, 21B are fixed to first and second carrier surfaces 31, 32 provided by four of the eight side surfaces of the octagon spacer body 30.

The material properties of the octagon spacer body advantageously determine the stability and robustness of the crossed cavity resonator design. With a preferred embodiment, the spacer body material is Corning 7972 ultra low expansion (ULE) glass (trade name), but glasses from other manufacturers can be used, as long as they feature similarly small thermal expansion. The coefficient of thermal expansion (CTE) for ULE glass is specified to (0±30) ppb/K for operating temperatures in the range of 5 to 35° C. Even for a much larger range of conceivable operating temperatures of −100 to +160° C., the CTE remains below 1 ppm/K. The CTE determines the length stability of the octagon spacer body 30 and thus the frequency stability of the resulting optical cavities. Furthermore, temperature inhomogeneities could induce stress in the spacer body, create an effective angle and thus influence the mode overlap. In addition to vacuum compatibility, this is another reason for why the invention relies on adhesive-free contacting the mirrors. Any adhesive has far worse thermal expansion properties than ULE glass, which would introduce a strong sensitivity of the mode overlap to temperature fluctuations.

FIG. 1 schematically illustrates an example of a mounting structure (clamp) 50, which can be used for mounting the optical resonator device 100 within a vacuum chamber 60. The mounting structure 50 comprises four screws 51 connecting a clamping plate 53 to a wall 61 of the vacuum chamber 60. Stainless steel balls 52 are provided to transmit the force between the spacer body 30 and the mounting structure 50 symmetrically at four different spots on the spacer body 30. The spacer body 30 is aligned with a vacuum viewport 62 within wall 61. The vacuum viewport 62 is made of glass, while the wall 61 is made of steel.

A first resonator light path 12 extends through a first spacer body bore 33 in the spacer body 30 between the first carrier surfaces 31, and a second resonator light path 22 extends through a second spacer body bore 34 between the second carrier surfaces 32. The first and second resonator light paths 12, 22 define a main resonator plane (x-y-plane), and they cross each other in a centre of symmetry of the spacer body 30, where the optical lattice trap 1 (FIG. 2) is formed. A third spacer body bore 35 with a third resonator light path 36 extends perpendicular to the main resonator plane (x-y) and crosses the first and second spacer body bores 33, 34 at their intersection. The spacer body 30 has two further spacer body bores 37 extending parallel to the main resonator plane (x-y) and orthogonally crossing the first and second spacer body bores 33, 34 at their intersection.

Figure 3:
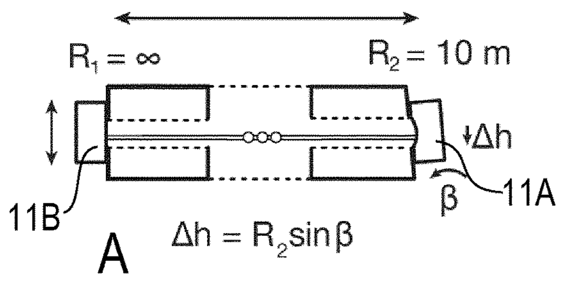
FIGS. 3 and 4: illustrations of mode adjustment in the optical resonator device.

Each combination of curved (11A, 21A) and flat (11B, 21B) mirrors forms an optical resonator with Hermite-Gaussian modes, as shown in FIG. 3. The mirrors 11A, 11B, 21A, 21B are attached to the spacer body 30 such that the lowest order Hermite-Gaussian modes (the $TEM_{00}$ modes) for each axis cross each other in the central third spacer body bore 35 of the octagon shape.

Each resonator mirror 11A, 11B, 21A, 21B comprises an e. g. 12.7 mm diameter fused silica mirror substrate and a mirror coating that is applied to a front mirror surface facing to the first and second optical resonators 10, 20, resp. For attaching the mirrors 11A, 11B, 21A, 21B to the first and second carrier surfaces 31, 32, all mirror substrates have an uncoated annulus around the mirror coating. This annulus is an interferometrically flat ring surface that allows attaching the mirror to the spacer body 30 without any adhesive. Instead, the mirrors are bonded to the spacer body 30 with van-der-Waals forces, by a process called optical contacting. The appropriate shape of mirror front surface, including the uncoated annulus and the mirror coating, can be manufactured by available polishing and deposition techniques and tested with an optical interferometer (e. g. Zygo PTI250).

The curved surface of the curved mirrors 11A, 21A has a very large radius R of curvature of about 10 m. Such a large radius is preferred, because the $1/e^2$ diameter two of the $TEM_{00}$ modes of the cavities is determined by $$2w_0 = 2\sqrt{\frac{\lambda L}{\pi}}\left(\frac{R-L}{L}\right)^{1/4} \quad (1)$$

where is the wavelength of the laser light coupled into the optical resonators and L=50 mm is the cavity length of the optical resonators. For a typical near-infrared wavelength of λ=813 nm used in strontium optical lattice clocks, Eqn. (1) predicts a mode diameter in the intersection region of the bores 33, 34 of 850 μm. Such large mode diameters are achieved with mirrors with the radius of curvature of 10 m. Polishing the annulus into 12.7 mm mirror substrates with such radii is technically challenging. The reason for this difficulty can be understood by calculating the depth of the central curved region of the curved surface. Assuming that the diameter of the curved region is D, the depth d of the spherical region can be calculated from $$d = \frac{D^2}{8R} \quad (2)$$

For the 12.7 mm diameter mirror substrate and a 2 mm wide contacting annulus, Eqn. (2) results in a depth of less than one micrometer. Such a small depth is obtained by extreme care when polishing the annulus into a curved substrate, while degrading the surface quality of the curved surface in the process is avoided. For comparison, a typical 50 cm radius-of-curvature one-inch substrate, which is used for typical laser reference cavities, can be flattened by about 160 μm to achieve an evenly large spherical region and a much larger annulus. Reducing R to 50 cm for the present geometry would result in a mode diameter of 360 μm for a wavelength of 689 nm. This reduction by more than a factor of two in mode diameter could be acceptable if a reduction in optical lattice homogeneity can be tolerated in a particular application of the invention.

The preferably large radius of curvature leads to strict requirements for the manufacturing precision of the octagon spacer body 30 to make sure that both $TEM_{00}$ modes are well overlapped. For radii-of-curvature of more than one meter, each mode is provided with a relative angle between the mirrors smaller than a few arcseconds, such that a mode can be generated at the center of the mirror without being clipped by the 4 mm diameter hole in the spacer. As illustrated in FIG. 3, the mode shift is given by $$\Delta h = R \sin \beta \quad (3)$$

From Eqn. (3), it can be seen that the mode shift is given by the relative angle β between the mirror surfaces and the radius of curvature R. This relation is independent of the length of the spacer body 30 along the optical resonator. Because a large R e. g. up to 10.2 m is employed and to minimize residual mode shifts, the specified relative angle preferably is restricted to 1 arcsecond on the opposite planes of the spacer body 30 with the 4 mm bores 33, 34.

Furthermore, an angle between an upper reference surface 38 (see FIG. 2) and the surface pairs 31, 32 assigned for the mirrors is specified to be below 30 arcseconds to provide orthogonal modes to surfaces when the octagon spacer is optically contacted to them. This orthogonality constraint is determined from $$\Delta h = L/2 \tan \gamma \quad (4)$$

where γ parametrizes the deviation from perfect orthogonality between the mirror surfaces and the upper reference surface 38. With the present specification, the resulting mode shifts can be limited to below 4 μm.

Another preferred feature of the design of spacer body 30 is the symmetry and the size of the bores 33, 34, 35 and 37. Larger holes reduce the mechanical stability and thus of the material against deformation, and accordingly lower the vibrational eigenfrequencies of the spacer body 30. The bore sizes are chosen such that a lowest vibrational eigenmode with a vibration frequency above typical energy scales in the quantum systems that are formed when trapping atoms in optical lattices, with the present embodiment e. g. 20 kHz, is obtained. This is preferred because vibrations of the spacer body 30 at the frequencies corresponding to these energy scales otherwise can cause strong heating leading to a loss of fidelity [19, 20]. Based on numerical simulations, the spacer design can be adapted to other vibrational frequency requirements by changing the bore sizes or spacer thickness.

Preferred features of the thickness of the spacer body 30 in z-direction (perpendicular to the main resonator plane) and the central bore diameter are selected so that the final optical lattice traps at the intersection of bores 33, 34 are accessible by high-resolution imaging optics of the imaging device 40 (see FIG. 1). The resolution of any imaging system is directly proportional to its numerical aperture. The numerical aperture is limited by the spacer body thickness and the diameter of the third spacer body bore 35. On the other hand, the spacer is at least thick enough to allow contacting the mirror substrates to its lateral first and second carrier surfaces 31, 32. Furthermore, the vacuum pumping speed out of the center of the spacer body 30 is given by the same numerical aperture considerations. For these reasons, the spacer body thickness and the central bore 35 diameter preferably are determined as a compromise between all of the above considerations.

Figure 4:
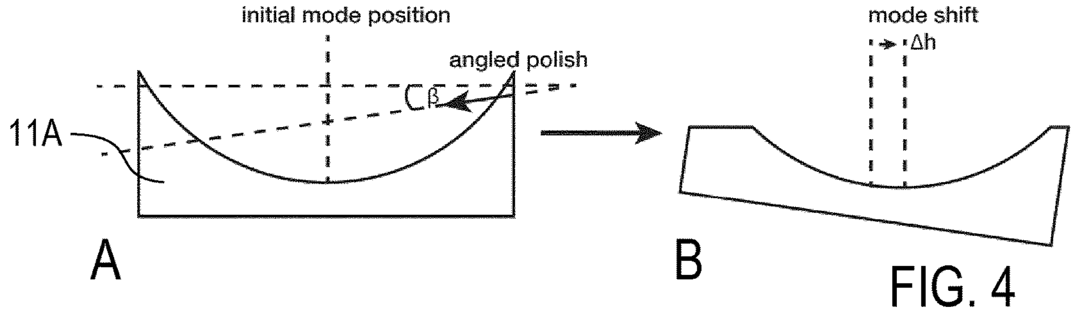

The angular tolerance given by Eqn. (3) also translates into a constraint on the tolerances of the substrates of the curved mirrors 11B, 21B. A mismatch angle between the curved region and the annular region leads to the same mode shift as in Eqn. (3). FIG. 4 visualizes how such a "wedge" error can come about through imperfect polishing. When the mirror is parallel to the spacer surface (first and second carrier surfaces 31, 32) or optically contacted, the deepest point of the curved surface determines the position of the mode. For this reason, the wedge error preferably is limited to the same angular tolerance as the spacer surface parallelism.

It is also preferred to apply the reflective coating to the curved mirror substrate after the polishing is finished. During the coating process, the annular region is masked off, such that no coating material is applied to the annulus. The main reason for this measure is that the inventors have found the bonding strength between a coated surface and the spacer to be significantly lower that of than an uncoated surface. Applying the mirror coating after polishing has two further advantages: First, it prevents the polishing process from scratching the reflective coating. Secondly, without the mirror coating, the spherical region can be repolished to maintain the proportions of annulus and radius of curvature.

Embodiments of an Atom Trap Apparatus

Figure 5:
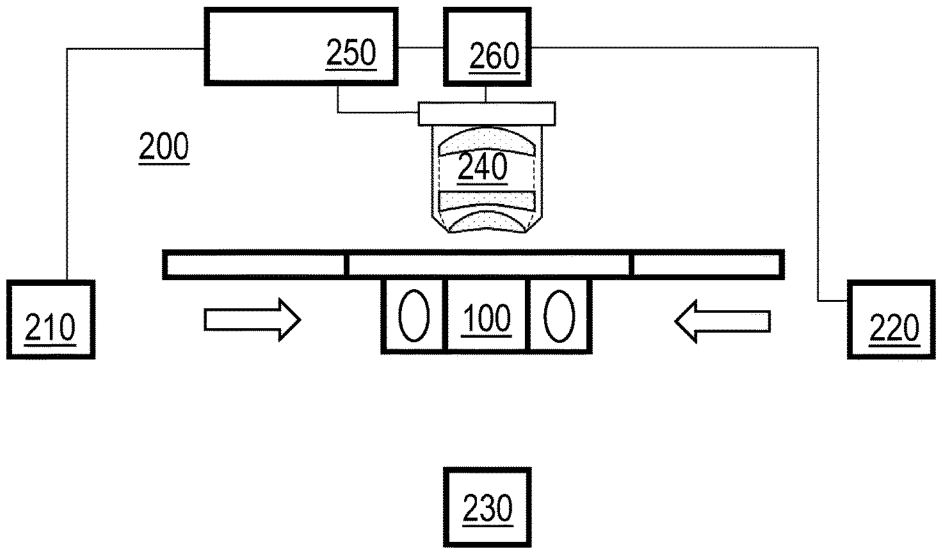
FIG. 5: features of embodiment of an atom trap apparatus according to the invention.

Embodiments of an atom trap apparatus 200 are described in the following with reference to FIG. 5 schematically showing applications as a transportable optical lattice clock or a lattice optic in quantum simulation. Generally, the atom trap apparatus 200 comprises the optical resonator device 100 according to the invention, a laser device with two laser sources 210, 220 being arranged and adapted for coupling continuous wave laser beams into the first and second optical resonators of the optical resonator device 100, an atom source and supply device 230 being connected with the optical resonator device 100, the imaging device 240 being adapted for imaging the optical trap lattice in the optical resonator device 100, and an interrogation laser 250. Instead of the two laser sources 210, 220, one single laser source can be used, if the adjustment thereof is sufficient. Furthermore, a control and measuring device 260 is provided, being arranged for controlling the components 210, 220, 230 and 240 and/or for collecting and analyzing measuring data. Preferably, the control and measuring device 260 comprises a computer unit. Further laser devices can be provided for manipulating and/or sensing the atoms in the optical trap lattice in the optical resonator device 100.

The inventive crossed cavity design of the optical resonator device 100 is especially suitable for implementation in transportable optical lattice clocks as discussed above. Since the invention employs a monolithic piece of material, e. g. highly stable glass, the overlap of the cavity modes will be stable over an unlimited amount of time. The cavity itself, as well as the overlap, are immune to shock, shaking or any short-term mechanical influence that does not damage the glass. Only long-term mechanical stress can change the overlap, when applied in a non-symmetric manner. This effect can be strongly suppressed by a proper mounting structure 50 (see FIG. 1), as done for any laser reference cavity. A detailed example of how to mount the crossed cavity is described below.

On satellites or space stations temperature fluctuations can be expected to be larger than in a laboratory on earth. The cavity spacer is made of e. g. ultra-low-expansion (ULE) glass that has a very small coefficient of thermal expansion. For particular temperatures, this coefficient even crosses zero, an effect that is exploited in laser reference cavities. For this reason, even thermal gradients that would change the relative angle of the mirrors lead to negligible changes in the mode overlap.

The resonator also serves as build-up cavity to enhance the power which is coupled into it. This allows to use larger beam diameters that result in larger system sizes as described above. In addition to larger system sizes, the build-up crossed cavity also reduces the power necessary to create deep enough lattices. For this reason, the invention can be used with low-power diode lasers instead of high-power solid state lasers, which is preferred feature for space-based system applications.

As described above, in the fields of quantum simulation and quantum metrology, one-dimensional optical lattices are generated by a focused incident light beam and a retroreflector. Cavities by design have perfect overlap of incident and retroreflected beam. To obtain a three-dimensional lattice, three one-dimensional lattices have to be overlapped. For retroreflected beams this results in many degrees of freedom which are sensitive when dealing with $1/e^2$ beam radii of about 100 μm. Even state-of-the-art laboratory experiments with retroreflected lattices exhibit drifts over the course of a single day [20].

The invention only uses a simple alignment procedure of the input beams to the optical resonator, because the optical resonator device 100 itself is stable and does not change. Aligning the input beams to the optical resonator device 100 is as simple as maximizing the transmission of a Gaussian transverse electric mode ($TEM_{00}$) mode through the optical resonator device 100. This procedure is much faster than aligning a free-space optical lattice, which requires on performing a full experiment with trapped atoms for each alignment trial.

Laser beams are not necessarily perfect Gaussian beams, especially when they are directly emitted by diode lasers. The laser beam quality degrades further the more optical components it traverses on its way to the atomic sample, mainly due to lens aberrations or scattering off of dust particles. In contrast, the inventive crossed cavity is able to filter and clean the mode at the position of the atoms, and its in-vacuum mirrors are protected from contamination.

As described above, the improvement in lattice homogeneity and beam diameter will thus lead to improved fidelities for quantum simulators and optical lattice clocks.

Embodiments of an Atom Trapping Method

Two well-overlapped, large-diameter, stable optical lattices are created as follows. Reference is made to an embodiment that is suitable as either an ultracold atom quantum simulator or an optical lattice clock and that is shown in FIG. 1.

In FIG. 1, a schematic view of the setup is shown, including the dimensions spacer width a of about 50 mm, width b of central bore 35 of about 20 mm, spacer body height c of about 15 mm and thickness d of vacuum viewport 62 of about 5 mm. The crossed cavity optical resonator device 100 is mounted on a vacuum side of an extreme-high vacuum (XHV) vacuum chamber 60 with pressures below $10^{-11}$ mbar. This pressure range is not required for the functionality of the optical resonator device 100 (it works fine in laboratory conditions), but is preferred to maximize the lifetime of atoms trapped in the optical lattice trap 1 created. Reaching atomic lifetimes far above typical experimental time scales of up to tens of seconds is used to achieve high fidelity in quantum simulations and quantum metrology.

According to FIG. 1, the crossed cavity optical resonator device 100 is clamped to the vacuum viewport 62, e. g with a thickness of 5 mm. In this example, the optical resonator device 100 is clamped to the glass with four screws 51. Stainless steel balls 52 transmit the force between the spacer body 30 and the mounting structure 50 symmetrically at four different spots on the spacer body 30. By applying clamping pressure evenly and symmetrically to the spacer body 30, the mode overlap stays unchanged, which can be verified during assembly with mode overlap measurement techniques.

A high-resolution microscope objective 41 of the imaging device 40 (high-resolution microscope) is mounted as close as possible to the center of the optical resonator device 100 to use the largest possible optical aperture. The objective 41 has a custom design that corrects for the spherical aberrations due to the presence of the viewport.

Optical lattices in the object plane of the imaging device 40 are then generated by coupling laser light into the two resonator modes of the crossed cavity. The laser frequency is preferably stabilized to a mode of the corresponding cavity (optical resonators 10, 20) using e. g. the standard Pound-Drever-Hall method. To improve the quality of the optical images collected with the imaging device 40, the atoms may be confined even more tightly in the vertical direction. The additional confinement can be implemented by propagating a third optical lattice from the bottom through the third spacer body bore 35 of the spacer body 30.

To further improve the insensitivity of the imaging system 40 to residual differential movement between the crossed cavity and the imaging optics, the vertical beam should be retroreflected off of the final optical surface of the microscope objective 41. This is obtained by custom optical coatings for both the vacuum viewport 61 and the front lens of the microscope objective 41.

Figure 7:
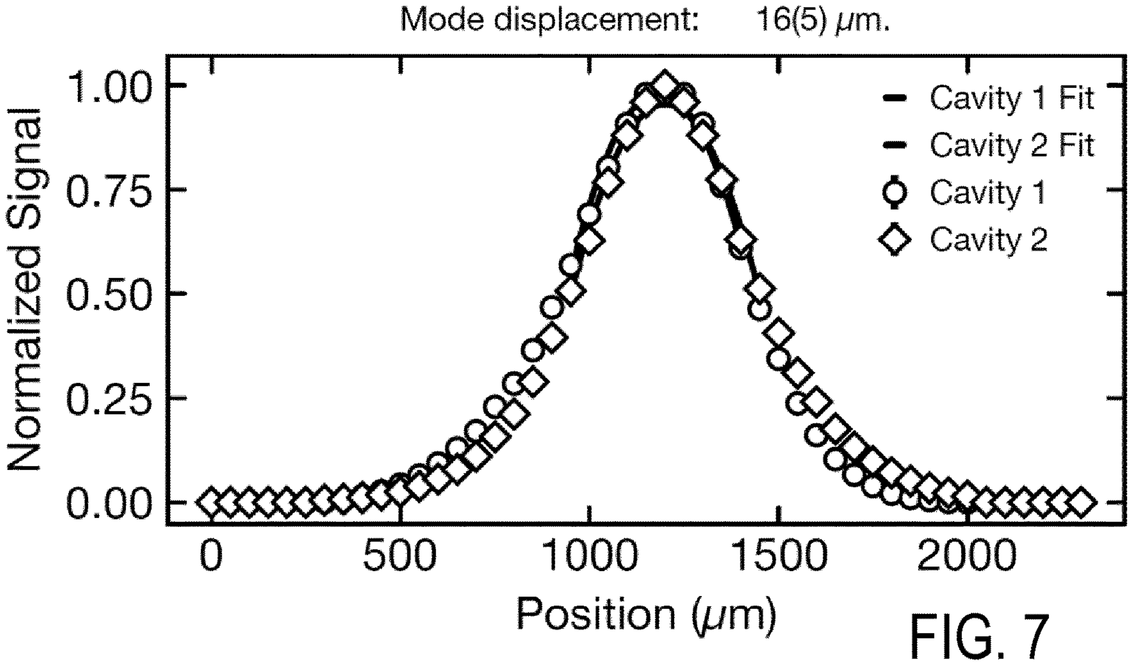
FIG. 7: an example of an overlap measurement after assembling the optical resonator device.

Ultracold atoms are loaded into the resulting three-dimensional optical lattice by transporting them to the center of the crossed cavity in one of two ways (schematically represented by 230 in FIG. 7). The first option is to transport the atoms into the cavity with another horizontal optical dipole trap that is generated by a non-retroreflected laser, e. g. through further spacer body bores 37 (see FIG. 2). By propagating this laser beam through one of the four 5 mm horizontal bores, and shifting its focus [21] from a preparation region to the center of the crossed cavity, the atoms can be transported into the region where the optical lattice forms. The second option is to create a magneto-optical trap (MOT) below the crossed cavity, and then to shift it upwards by changing the zero of the trap's magnetic field. In either case, the depth of the optical lattices needs to be ramped up slowly while the transporting trap is turned off to transfer the atoms optimally. To reduce the atomic temperature when transferring directly from a MOT, an intermediate evaporative cooling step can be used. If an optional vertical lattice is used, a single layer in the object plane can be isolated by using a vertical magnetic field gradient. This gradient allows removing individual layers of atoms by heating them with resonant laser light until they get ejected from the optical lattice.

Once a single layer is isolated, experiments in the horizontal two-dimensional lattice can be performed. For a quantum simulation, additional laser beams and magnetic fields can be used to control the evolution of the atoms as they tunnel in the lattice and interact with each other. For an optical frequency standard, the atoms would be prevented from tunneling by increasing the horizontal lattice depth, and then would be interrogated with a spectroscopy laser, e. g. through the further spacer body bores 37. Preferably, a fluorescence image of the atoms is taken on a camera during and/or at the end of the procedure. In an optical frequency standard, resolving individual lattice sites might not be as important as for a quantum simulator, and one could use a photomultiplier tube to detect a spatially integrated atomic signal instead. High optical resolution is still beneficial even in this case, because it maximizes the signal-to-noise ratio of the atomic signal. Once an experiment has been performed, the atoms would be removed by turning off the optical lattices, and a new sample would be prepared as explained above.

The invention maximizes the available optical access for control beams by providing the large central bore 35 as well as the four horizontal 5 mm bores 33, 34, 37. The central bore's 35 20 mm diameter is determined as a compromise between mechanical stability (and high acoustic eigenfrequencies) and the need for optical access and vacuum pumping speed in the center of the crossed cavity.

Mounting and Assembling the Optical Resonator Device

Figure 6:
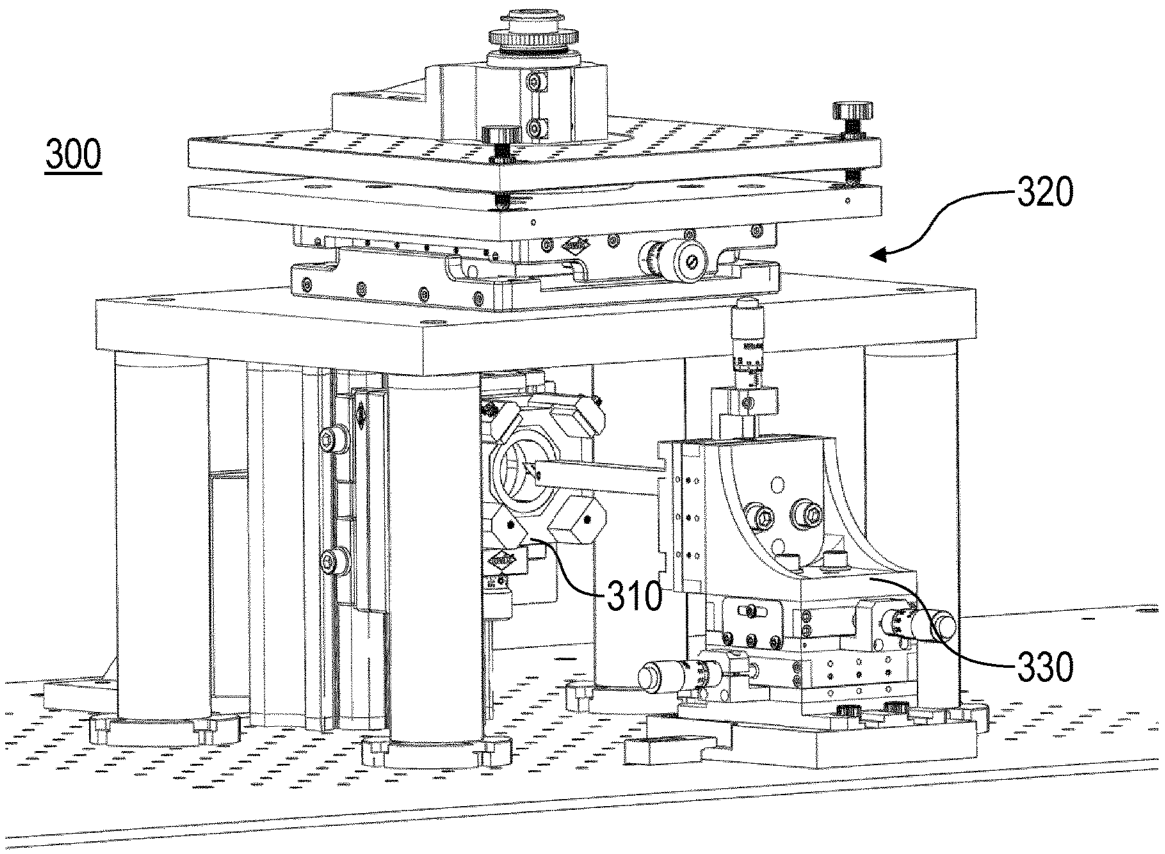
FIG. 6: an embodiment of an apparatus for manufacturing the optical resonator device according to the invention.

The optical resonator device 100 is assembled and the quality of the mode overlap is verified by employing a mounting device 300 as shown in FIG. 6. With the mounting device 300 the mirrors are attached to the octagon spacer body 30 in a deterministic way while monitoring the quality of the mode overlap.

Preferably, both the spacer body and the mirrors are cleaned before mounting to make the bond between the two surfaces possible. Although special repolishing agents exist that facilitate the optical contact between two flat and smooth glass surfaces, they preferably are not used because of their unknown outgassing properties under XHV conditions. For this reason, a cleaning procedure is used similar to the ones used in semiconductor fabrication.

The spacer body is cleaned by suspending it on a stainless steel wire in a beaker of RCA1 cleaning solution consisting of unstabilized hydrogen peroxide (30%), ammonium hydroxide (28-30%), and HPLC-grade or semiconductor-grade water with a mixing ratio of 1:1:5. The solution is boiled for 15 minutes at 80° C. in a fume hood. Residual ammonia is then removed by suspending the beaker in an ultrasonic bath using HPLC-grade water for three minutes. Finally, the spacer body is stored suspended in another pre-heated beaker of HPLC-grade water. In this beaker, the spacer body can be transported without exposing it to dust. Once the spacer is ready to be used, it is removed from the beaker and residual water droplets are blown off with particle-filtered dry nitrogen.

After cleaning, the assembly described is performed as described below in a separately constructed "clean enclosure." In this enclosure, laminar air flow is ensured by using a HEPA filter.

Before the mirrors are attached to the spacer body, they are cleaned as well. For this purpose, each mirror is placed on a spin coater, which rotates the mirror at 8000 rpm. While the mirror rotates, HPLC-grade isopropanol is sprayed onto its surface and simultaneously it is wiped from the center towards the edge with a lint-free Q-tip. Afterwards, HPLC-grade water is sprayed onto the mirror to flush away any residues of isopropanol. When the substrate has stopped rotating, the remaining water droplets are blown off with dry nitrogen. The mirror is then placed in the mirror holder and the contacting procedure begins as described in the following.

To assemble the optical resonator device 100, the mounting device 300 of FIG. 6 provides a contacting stage allowing to attach the mirrors to the spacer body in a precisely controlled manner. The mounting device 300 comprises of a holder 310 for the spacer body (not shown in FIG. 6) and a four-axis stage 320 that holds the mirror that is to be contacted.

The holder 310 is attached to a vertical translation stage which itself sits on an optical rail. This combination allows to move the spacer body along a vertical direction over a large distance with high precision. By moving the spacer body upwards, the top-facing surface is brought close to a first mirror that will be attached to it.

The mirror itself is held in a cylindrical mirror holder that only lightly clamps the mirror around its circumference to prevent mirror deformation. The mirror holder is attached to the four-axis stage 320 that both allows to move the mirror horizontally and to tilt it in two axes with respect to the space body surface. Once the mirror has been brought into its final position, a PTFE-tipped punch is used to release the mirror from its holder and to push it onto the spacer body, where it bonds through direct optical contact.

On top of the tip-tilt stage 320, an interferometer and an interferometer imaging system are built that images the interferogram between the mirror's front surface and the space body's top surface. By observing this interferogram, the tip-tilt stage 320 is used to make the mirror's contacting annulus parallel to the octagon surface. This alignment procedure simulates a situation of the contacted mirror.

With more details of interferometry, alignment of the mirrors to the spacer body, in particular centering the mirrors onto one of the spacer body bores and making sure that the mirror is as parallel as possible to the spacer body carrier surface is tested by interferometry. A typical interferogram has a bright region in the center, resulting from a direct reflection of interferometer light off of the mirror coating. The bright region is surrounded by a small dark ring which represents the bevel on the spacer body bore. The bevel reflects the interferometer light out of the field of view of the interferometer imaging system, which results in the dark ring. As a first alignment step, the mirror is coarsely centered on the bore by centering the bright region on the dark ring.

A main feature of the interferogram are its curved and straight fringes. The curved fringes result from the interference between the octagon spacer body carrier surface and the curved region of the mirror. Straight vertical fringes result from interference between the carrier surface and the mirror's contacting annulus. These fringes are made to vanish to ensure that the annulus is parallel to the carrier surface. Parallelism corresponding to a quarter of a fringe for interferometer light at 633 nm practically can be reached. This parallelism corresponds to a residual relative angle of 1.4 arcseconds, which would result in a residual mode shift of 69 μm for R=10.2 m. For this reason the contacting procedure is repeated for the final mirror a few times, until the final measured overlap is optimized.

Both flat mirrors are optically contacted to the spacer body by aligning their center to the bores 33, 34 in the spacer body (see FIG. 2) which can be seen in the measured interferogram as described. For the first of the curved mirrors it is interferometrically ensured that it is centered and parallel to the spacer body surface. In this situation, the first of the curved mirrors is optically contacted to the spacer body. Subsequently, the octagon spacer body is rotated by 90° in its mount 310 and the interferogram is aligned again after mounting the second curved mirror. Laser light is coupled into the cavities formed by the curved mirrors and the facing flat mirrors. The laser's frequency is scanned and the cavity transmissions are measured by two photodetectors. With this method, it is ensured that light is coupled only into the $TEM_{00}$ modes of both cavities.

For aligning the second of the curved mirrors, a slit (or a knife edge) is used mounted on another three-axis translation stage 330 to determine the position of the mode of the second cavity relative to the mode of the first cavity. This is done by moving the slit into the central bore 35 of the spacer body 30 (see FIG. 2) and partially obstructing the $TEM_{00}$ modes with the slit. As a function of slit position, the height of the transmission peak associated with the $TEM_{00}$ modes is observed. By maximizing the transmission, the slit is centered on the position of the modes and it is made sure that the modes overlap each other with zero or minimal displacement. If they do not, the second curved mirror is translated horizontally while making sure that it remains parallel to the octagon space body surface until the modes are sufficiently overlapped. When the modes are overlapped, the second curved mirror is optically contacted using the method described above.

With more details, once the second curved mirror is interferometrically aligned to the octagon spacer, laser light is coupled into the cavity formed between this curved mirror and the already attached flat mirror. Laser light at 689 nm is used for all such measurements, which results in a mode diameter of $2w_0$=791 μm according to Eqn. (1). Preferably, it is coupled to the $TEM_{00}$ mode with at least 95% efficiency to obtain usable transmission data for the following steps. The laser frequency is scanned over more than one free spectral range of the cavity, and the transmission is measured on a photodiode, and the resulting voltage trace is observed on an oscilloscope. The same is done with the second, already finished, cavity. As discussed before, the overlap of both cavity modes is determined by inserting the slit into the central bore 35 of the octagon spacer body 30. The slit is machined into a thin sheet of stainless steel. This sheet has two orthogonal slits with 700 μm width and a slit roughness of 20 μm. The short slit is used to determine the in-plane position where the projection of both modes crosses. This position is determined by the translation stage position where both modes simultaneously maximally transmit. Once this position has been found, the long slit is used to determine the out-of-plane overlap of both beams.

By plotting the transmission of both cavity modes versus out-of-plane position of the translation stage, typical results are found as shown in FIG. 7. FIG. 7 shows a result of a typical overlap measurement conducted with a slit. The laser frequency is scanned while the slit is moved through the cavity. The transmission of each of the mode is highest when the slit is centered on the mode. The peaks can be fitted with a parabola to determine the displacement of the modes. Thus, a simple way to determine the residual out-of-plane displacement between the cavity modes is to fit the parabola to each peak. In this case, this procedure results in a residual displacement of 16(5) μm, or 2% of the mode diameter.

Because of the stringent parallelism specifications of the spacer body, the mode-displacement can be corroborated by taking an image of the transmitted laser beam as it exits the cavity, which directly shows the displacement of the mode with respect to the mirror and the cavity bore.

In separate measurements, the finesse (and thus the power enhancement) of cavities generated by the cavity mirrors has been verified. With a multiband reflective coating appropriate for the particular experiments, it has been found that finesses can be achieved that are above the specification for all wavelengths under consideration. For the considered case, power amplifications factors of 100-1000 can be sufficient. By adapting the coating, the invention can be adapted to any wavelength where high-quality optical coatings are available. For fewer wavelengths of interest, one can easily achieve even higher amplification factors.

The features of the invention disclosed in the above description, the drawings and the claims can be of significance individually, in combination or sub-combination for the implementation of the invention in its different embodiments.

The invention claimed is:

1. An optical resonator device with crossed cavities, comprising a first linear optical resonator extending between first resonator mirrors along a first resonator light path and supporting a first resonator mode, a second linear optical resonator extending between second resonator mirrors along a second resonator light path and supporting a second resonator mode, wherein the first and second resonator light paths span a main resonator plane, and a carrier device carrying the first and second resonator mirrors, wherein the first and second resonator mirrors are arranged such that the first and second resonator modes cross each other for providing an optical lattice trap in the main resonator plane, wherein the carrier device comprises a monolithic spacer body being comprised of an ultra-low-expansion material and comprising first carrier surfaces accommodating the first resonator mirrors and second carrier surfaces accommodating the second resonator mirrors, and the first resonator light path extends through a first spacer body bore in the spacer body between the first carrier surfaces, and the second resonator light path extends through a second spacer body bore in the spacer body between the second carrier surfaces.

2. The optical resonator device according to claim 1, wherein the first and second resonator mirrors are bonded to the first and second carrier surfaces respectively in an adhesive-free manner.

3. The optical resonator device according to claim 2, wherein the first and second resonator mirrors are optically bonded to the first and second carrier surfaces respectively.

4. The optical resonator device according to claim 1, wherein the first resonator mirrors comprise a first curved mirror, and the second resonator mirrors comprise a second curved mirror, wherein the first and second resonator mirrors are designed such that the first and second resonator modes include lowest order Hermite-Gaussian modes of the first and second resonators, respectively.

5. The optical resonator device according to claim 4, wherein the first and second curved mirrors have a radius of curvature being selected such that the optical lattice trap has a dimension of 2* $w_0$ in the main resonator plane of at least 300 μm, wherein $w_0$ is the $1/e^2$ radius of the first and second resonator modes.

6. The optical resonator device according to claim 4, wherein the first resonator mirrors comprise the first curved mirror and a first plane mirror, and the second resonator mirrors comprise the second curved mirror and a second plane mirror.

7. The optical resonator device according to claim 1, wherein the monolithic spacer body comprises ultra-low-expansion glass or crystalline silicon.

8. The optical resonator device according to claim 1, wherein the first and second spacer body bores are orthogonal relative to each other in the main resonator plane.

9. The optical resonator device according to claim 1, wherein the first and second spacer body bores are arranged with mirror symmetry relative to a plane perpendicular to the main resonator plane.

10. The optical resonator device according to claim 1, wherein the monolithic spacer body has a third spacer body bore extending perpendicular to the main resonator plane and crossing the first and second spacer body bores spacer body bores at their intersection.

11. The optical resonator device according to claim 10, further comprising an imaging device being arranged for imaging the optical lattice trap along the third spacer body bore.

12. The optical resonator device according to claim 10, wherein the third spacer body bore is arranged for accommodating a third light path with a direction deviating from the main resonator plane, wherein a retroreflector mirror is arranged for creating a trapping light field along the third light path.

13. The optical resonator device according to claim 1, wherein the monolithic spacer body comprises at least one further spacer body bore extending parallel to the main resonator plane and crossing the first and second spacer body bores at their intersection.

14. The optical resonator device according to claim 13, wherein the monolithic spacer body comprises two further spacer body bores being symmetrically arranged relative to the arrangement of the first and second spacer body bores.

15. The optical resonator device according to claim 1, wherein the monolithic spacer body has a shape of an octagon extending parallel to the main resonator plane, wherein the first and second carrier surfaces are lateral side surfaces of the octagon.

16. The optical resonator device according to claim 1, wherein the first and second resonator mirrors comprise dielectric coatings providing a reflectivity of at least 99%.

17. The optical resonator device according to claim 16, wherein the dielectric coatings are designed such the reflectivity of at least 99% is provided for multiple resonant wavelengths of the first and second optical resonators.

18. The optical resonator device according to claim 1, having at least one of the following features:

the spacer body has a dimension in the main resonator plane in a range from 3 cm to 20 cm, the first and second resonator mirrors have a diameter in a range from 10 mm to 30 mm, each of the first and second resonator mirrors comprise a curved mirror having a radius of curvature in a range from 1 m to 20 m, and the first and second resonator mirrors are arranged with an alignment such that the reflected laser beams within the first and second optical resonators are displaced from a center of the bore by less than 25% of the bore diameter.

19. An atom trapping method for creating a two-dimensional arrangement of atoms, wherein the optical resonator device according to claim 1 is used, comprising the steps of creating the optical lattice trap in a region where the first and second resonator modes cross each other, introducing a cloud of atoms into the optical resonator device, and trapping the atoms in the optical lattice trap.

20. The atom trapping method according to claim 19, wherein the step of creating the optical lattice trap comprises coupling first and second continuous wave (ewi-laser beams into the first and second optical resonators, respectively, and overlapping the first and second resonator modes at an intersection of the first and second spacer body bores.

21. The atom trapping method according to claim 19, further comprising at least one of imaging the atoms trapped in the optical lattice trap with an imaging device, exciting and detecting transitions between energy states of the trapped atoms, and exploiting interactions between the atoms for purposes of at least one of quantum simulation and/or quantum computing.

22. An atom trap apparatus, being configured for creating a two-dimensional arrangement of atoms, comprising the optical resonator device according to claim 1, a laser device being configured for coupling continuous wave laser beams into the first and second optical resonators, an atom source and supply device being connected with the optical resonator device, and an imaging device being configured for imaging the optical lattice trap in the optical resonator device.

23. The atom trap apparatus according to claim 22, being configured as an optical atomic clock.

24. The atom trap apparatus according to claim 22, being configured as a quantum simulation or quantum computing device.

25. The optical resonator device according to claim 1, being configured for optically trapping atoms.

* * * * *